(12) United States Patent
Pmsvvsv et al.

(10) Patent No.: US 12,139,802 B2
(45) Date of Patent: Nov. 12, 2024

(54) ELECTROLYZER POWER MANAGEMENT AND POWER SYSTEM CONTROL

(71) Applicant: Bloom Energy Corporation, San Jose, CA (US)

(72) Inventors: Prasad Pmsvvsv, San Jose, CA (US); Chaitanya Mandela, San Jose, CA (US); Rakesh Roy, San Jose, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 0 days.

(21) Appl. No.: 18/178,865

(22) Filed: Mar. 6, 2023

(65) Prior Publication Data
US 2023/0279571 A1 Sep. 7, 2023

Related U.S. Application Data

(60) Provisional application No. 63/316,950, filed on Mar. 4, 2022.

(51) Int. Cl.
*C25B 15/023* (2021.01)
*H02J 3/00* (2006.01)
*C25B 1/04* (2021.01)

(52) U.S. Cl.
CPC ............ *C25B 15/023* (2021.01); *H02J 3/001* (2020.01); *C25B 1/04* (2013.01)

(58) Field of Classification Search
CPC ......... C25B 15/023; C25B 1/04; C25B 15/02; C25B 9/65; H02J 3/001; H02J 1/14; H02J 13/0001; H02J 3/14; H02J 3/32
See application file for complete search history.

(56) References Cited

PUBLICATIONS

Hua Han et al., "The coordinated control strategy of hybrid microgrid based on the maximum utilization of PV generation", 2015 Chinese Automation Congress (CAC), IEEE, Nov. 27, 2015 (Nov. 27, 2015), pp. 1416-1421, XP032850601, DOI: 10.1109/CAC.2015.7382721 [retrieved on Jan. 13, 2016].
Xia Yanghong et al., "Distributed Coordination Control for Multiple Bidirectional Power Converters in a Hybrid AC/DC Microgrid", IEEE Transactions on Power Electronics, Institute of Electrical and Electronics Engineers, USA, vol. 32, No. 6, Jun. 1, 2017 (Jun. 1, 2017), pp. 4949-4959, XP011640900, ISSN: 0885-8993, DOI: 10.1109/TPEL.2016.2603066 [retrieved on Feb. 10, 2017].
Han Ying et al., "Mode-trigerred droop method for the decentralized energy management of an islanded hybrid PV/Hydrogen/battery DC microgrid", Energy, Elsevier, Amsterdam, NL, vol. 199, Mar. 31, 2020 (Mar. 31, 2020), XP086138913, ISSN: 0360-5442, DOI: 10.1016/J.ENERGY.2020.117441 [retrieved on Mar. 31, 2020].
Matthew A. Pellow et al., "Hydrogen or batteries for grid storage? A net energy analysis", Energy & Environmental Science, vol. 8, No. 7, Jan. 1, 2015 (Jan. 1, 2015), pp. 1938-1952, XP055468158, Cambridge ISSN: 1754-5692, DOI: 10.1039/C4EE04041D.
Search Report mailed Jul. 25, 2023 in corresponding European Patent Application No. 23160151.9.

*Primary Examiner* — Daniel Cavallari
(74) *Attorney, Agent, or Firm* — THE MARBURY LAW GROUP PLLC

(57) ABSTRACT

A power control device for an electrolyzer that is configured to encode power curtailment information as a DC bus voltage level using a DC droop characteristic in first stage and decode the DC bus voltage to power information in a second stage.

17 Claims, 11 Drawing Sheets

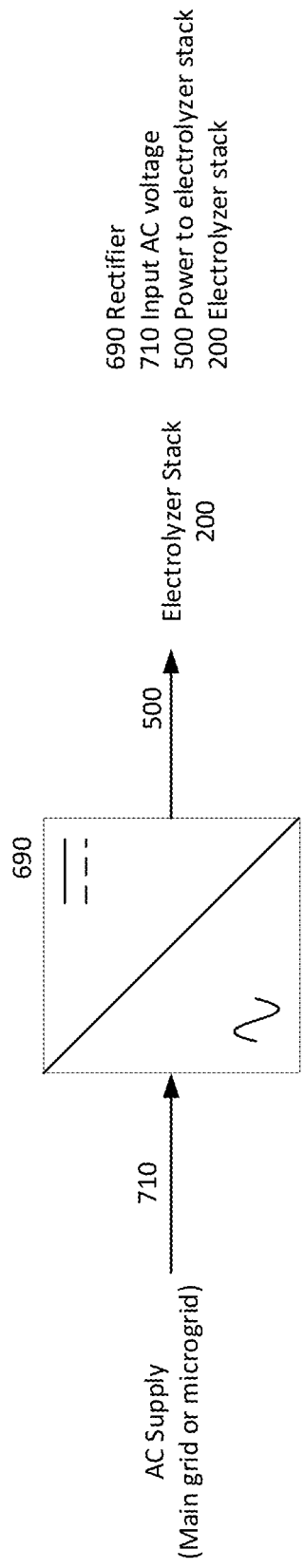

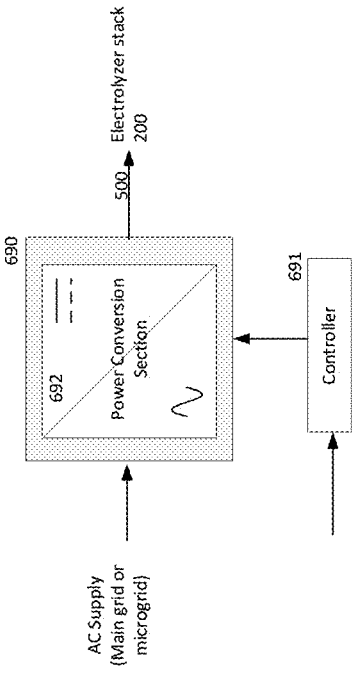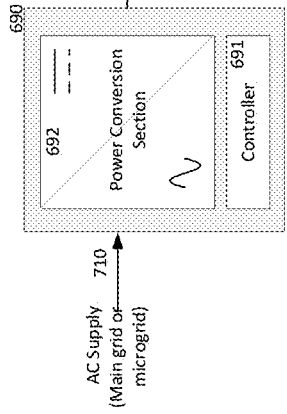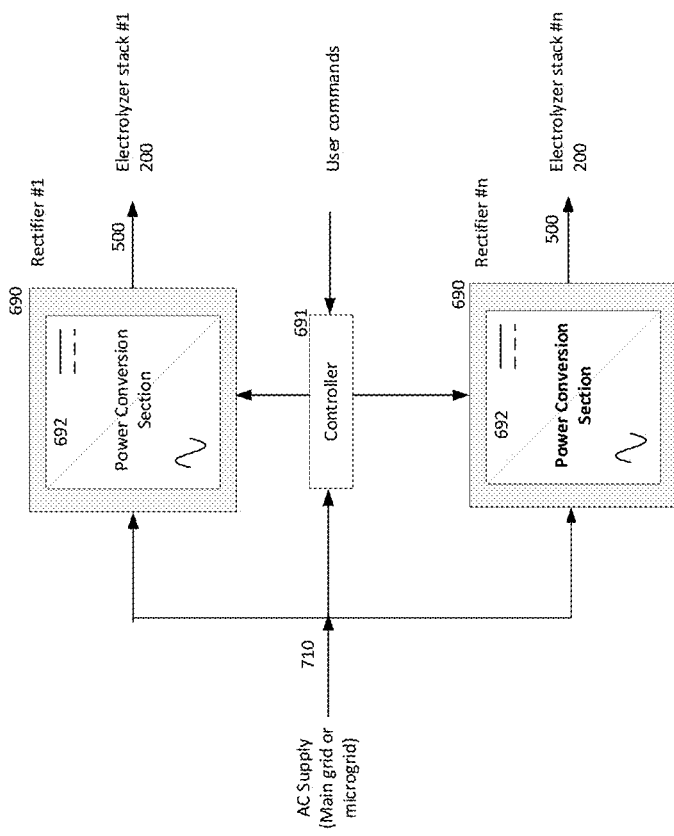

300

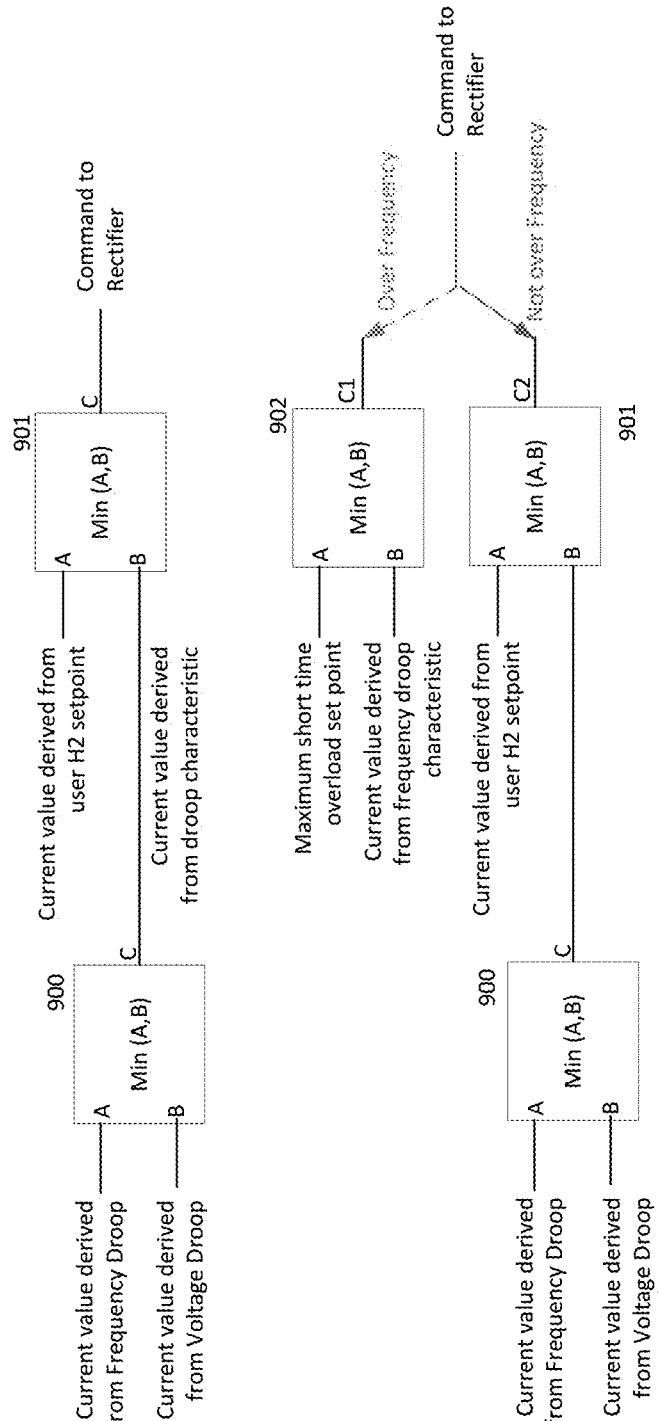

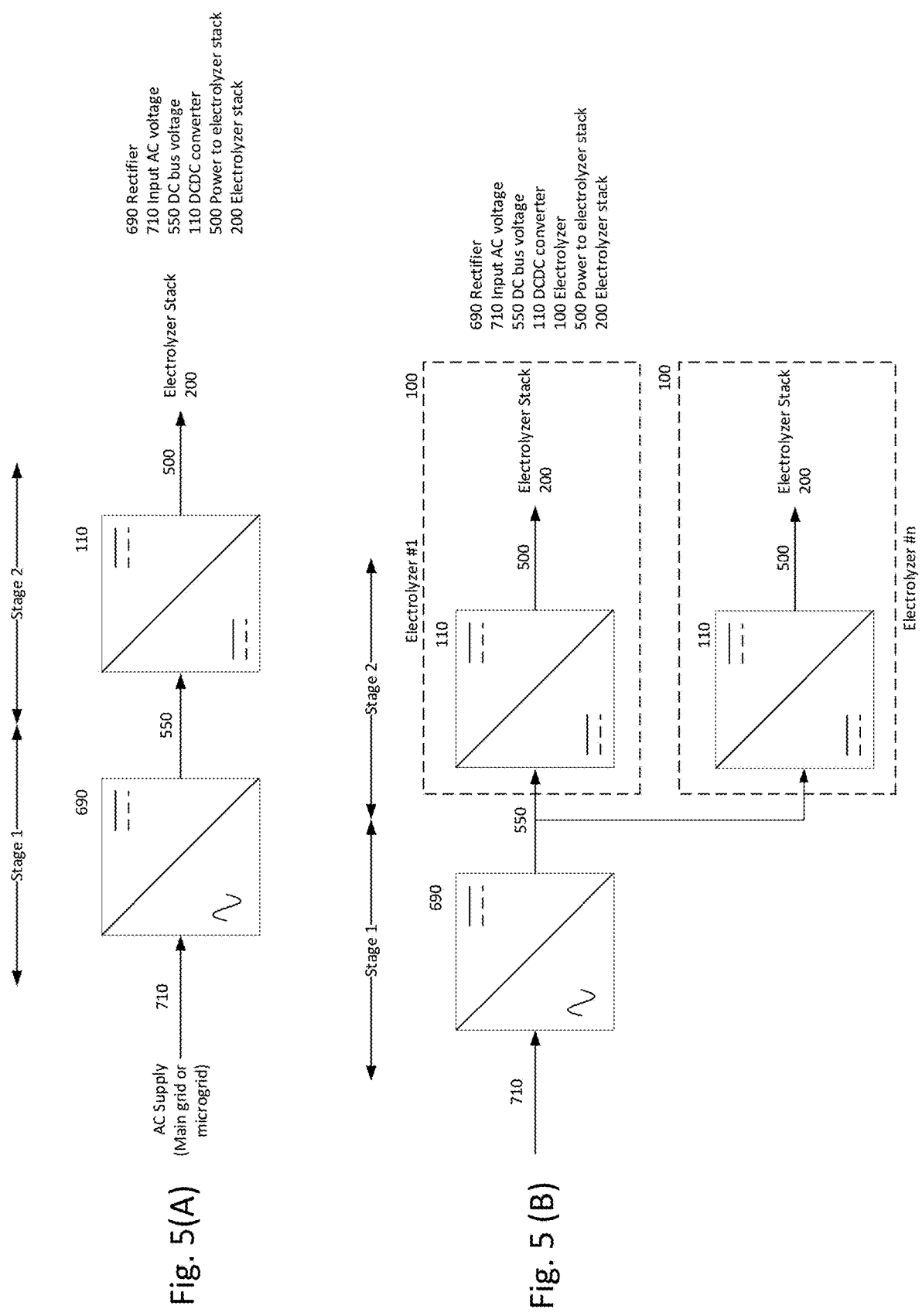

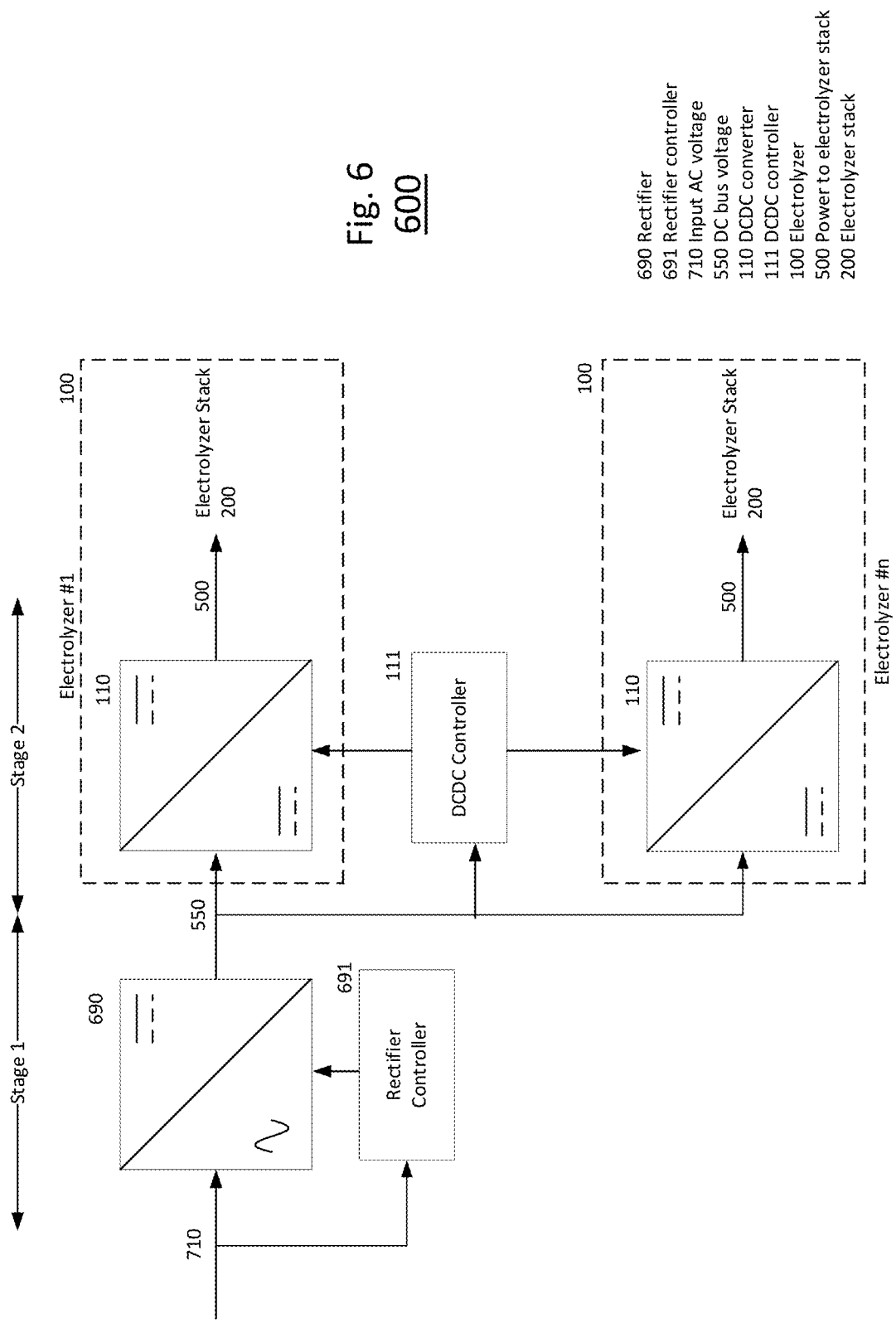

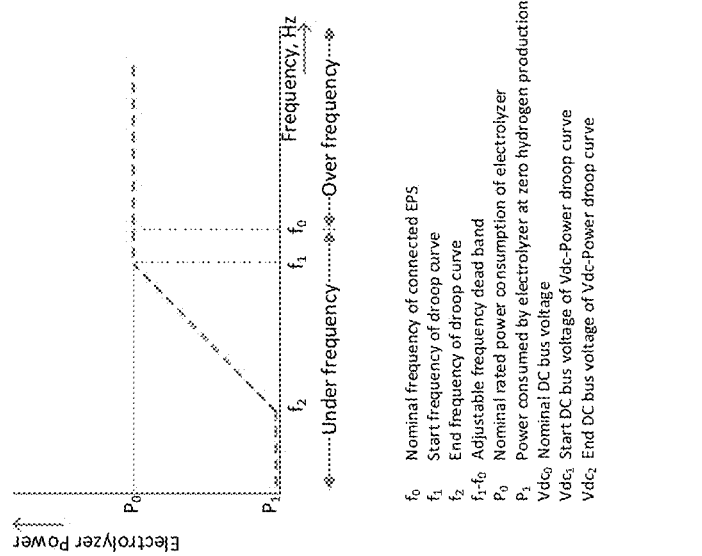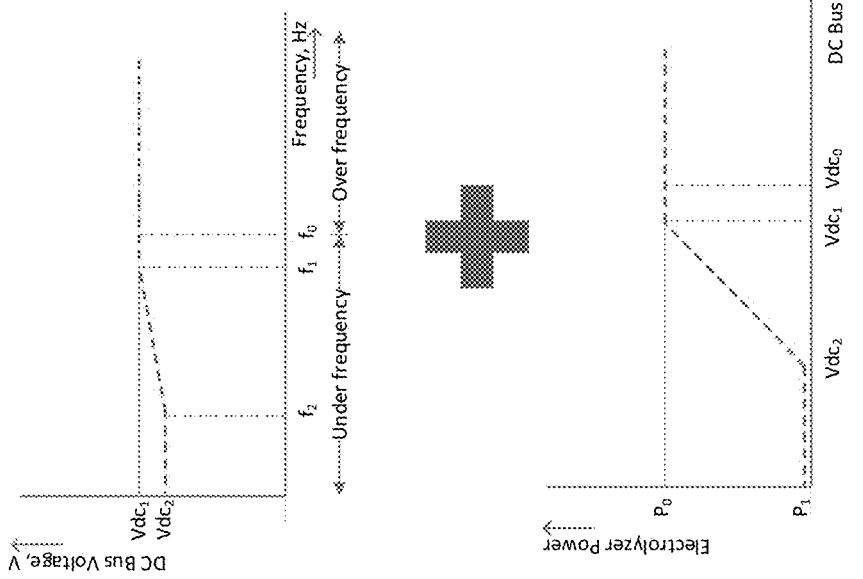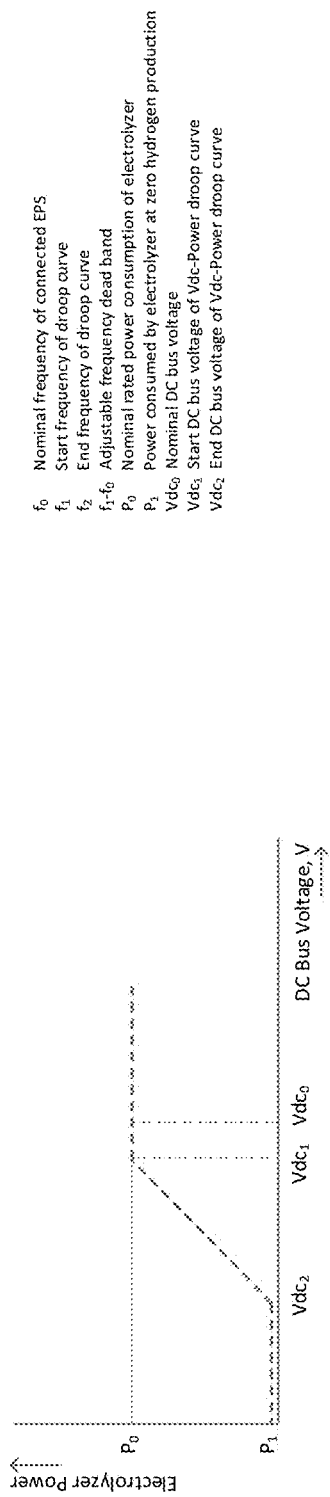

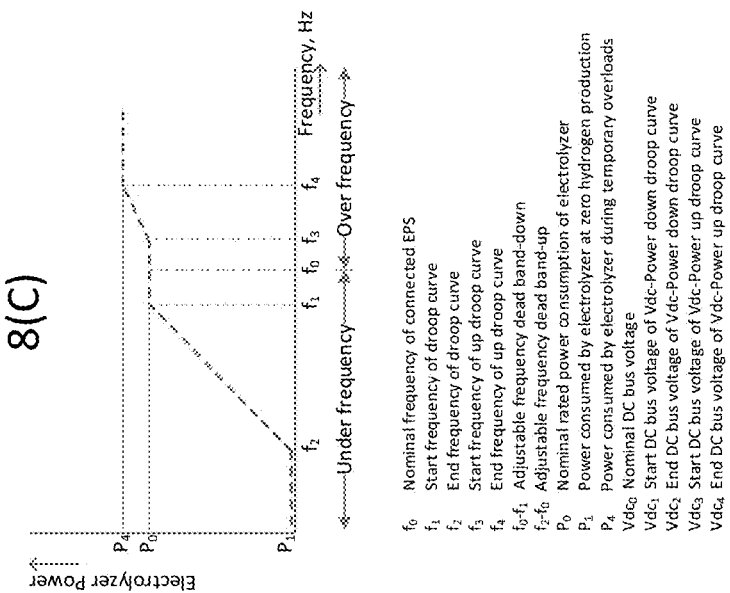
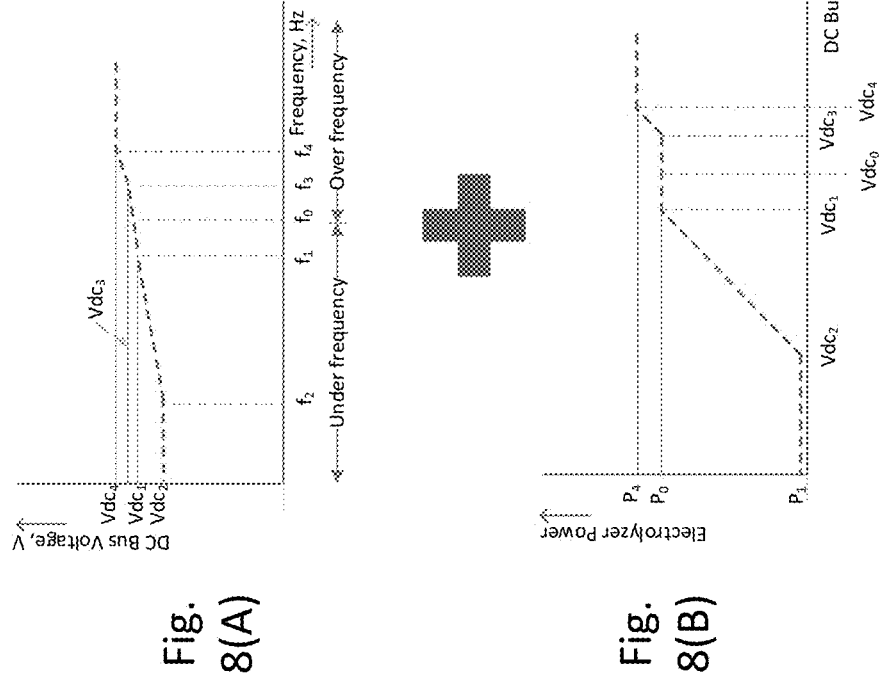

$f_0$  Nominal frequency of connected EPS
$f_1$  Start frequency of droop curve
$f_2$  End frequency of droop curve
$f_3$  Start frequency of up droop curve
$f_4$  End frequency of up droop curve
$f_1$-$f_0$  Adjustable frequency dead band-down
$f_3$-$f_0$  Adjustable frequency dead band-up
$P_0$  Nominal rated power consumption of electrolyzer
$P_1$  Power consumed by electrolyzer at zero hydrogen production
$P_4$  Power consumed by electrolyzer during temporary overloads
$Vdc_0$  Nominal DC bus voltage
$Vdc_1$  Start DC bus voltage of Vdc-Power down droop curve
$Vdc_2$  End DC bus voltage of Vdc-Power down droop curve
$Vdc_3$  Start DC bus voltage of Vdc-Power up droop curve
$Vdc_4$  End DC bus voltage of Vdc-Power up droop curve

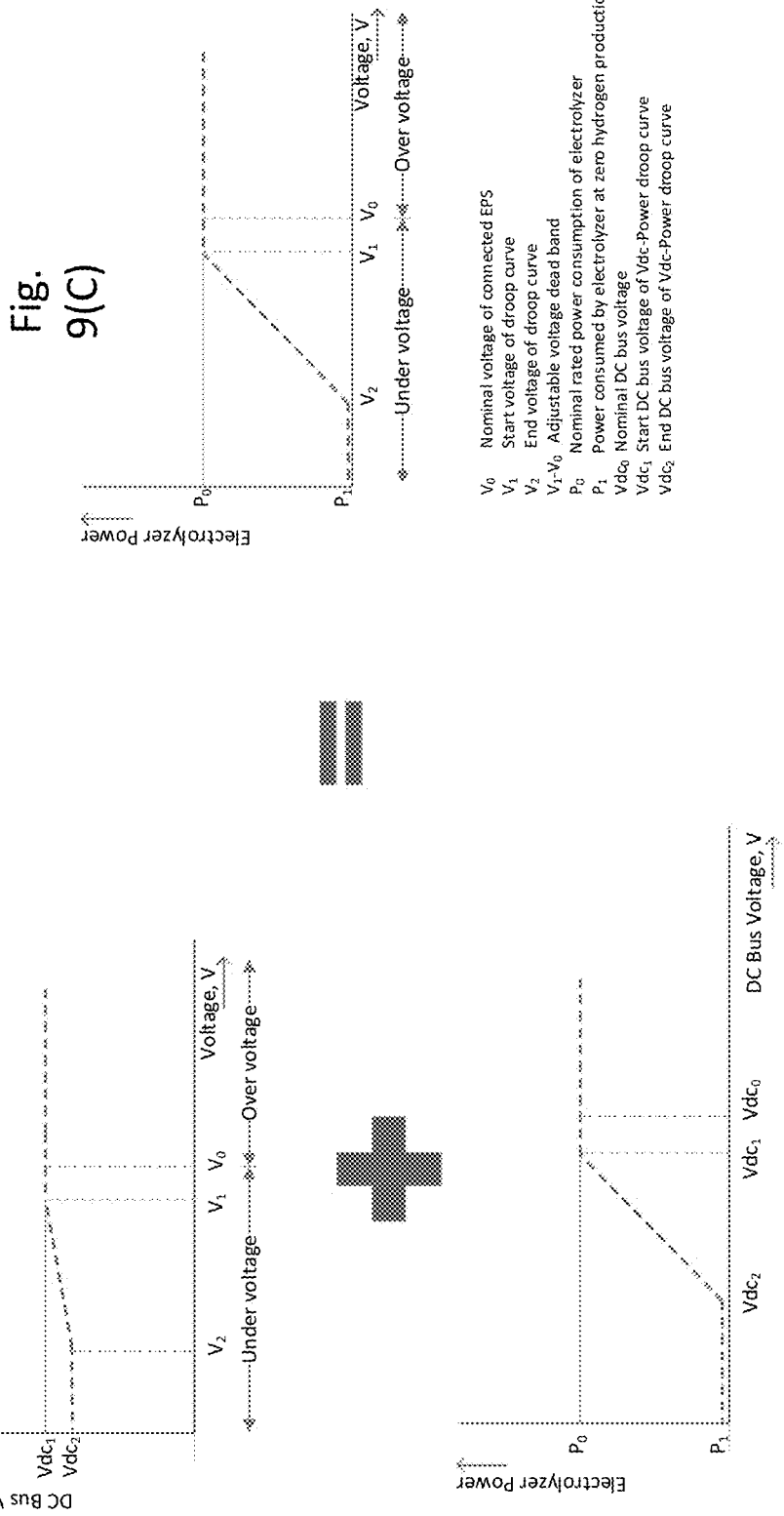

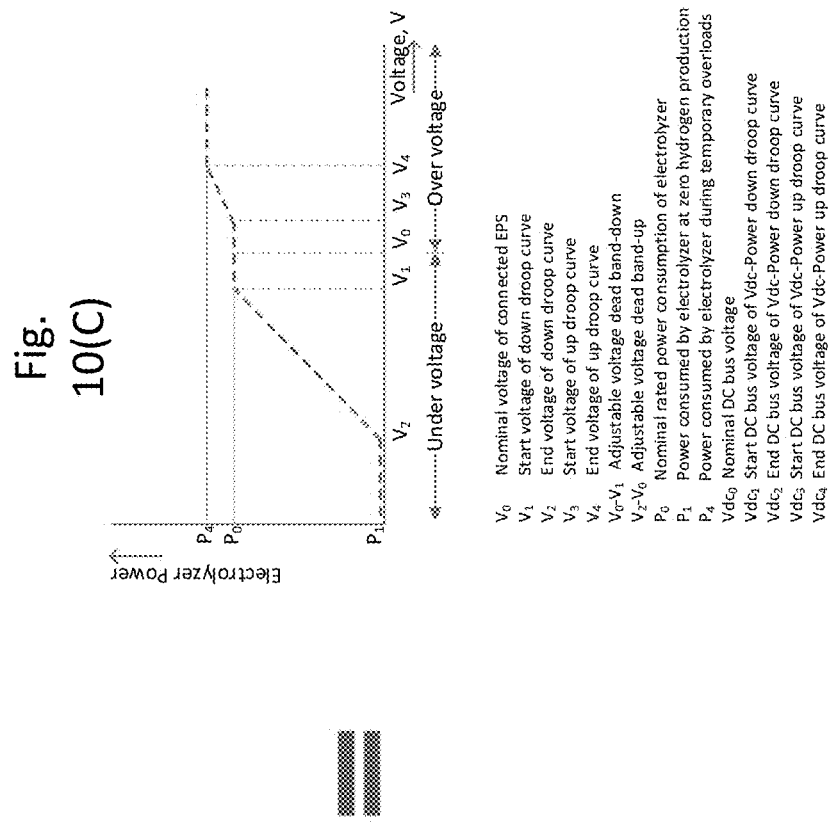
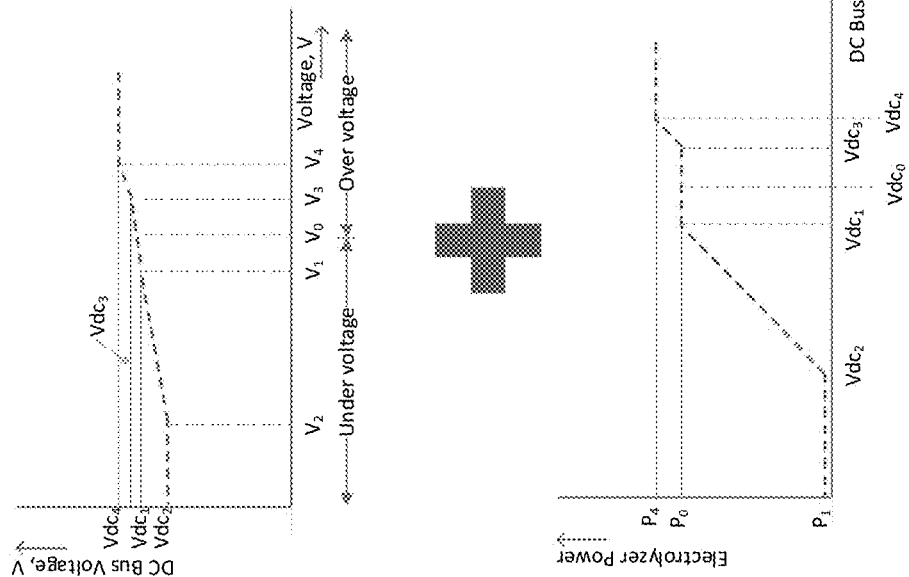

$V_0$ Nominal voltage of connected EPS
$V_1$ Start voltage of down droop curve
$V_2$ End voltage of down droop curve
$V_3$ Start voltage of up droop curve
$V_4$ End voltage of up droop curve
$V_0$-$V_1$ Adjustable voltage dead band-down
$V_2$-$V_0$ Adjustable voltage dead band-up
$P_0$ Nominal rated power consumption of electrolyzer
$P_1$ Power consumed by electrolyzer at zero hydrogen production
$P_4$ Power consumed by electrolyzer during temporary overloads
$Vdc_0$ Nominal DC bus voltage
$Vdc_1$ Start DC bus voltage of Vdc-Power down droop curve
$Vdc_2$ End DC bus voltage of Vdc-Power down droop curve
$Vdc_3$ Start DC bus voltage of Vdc-Power up droop curve
$Vdc_4$ End DC bus voltage of Vdc-Power up droop curve

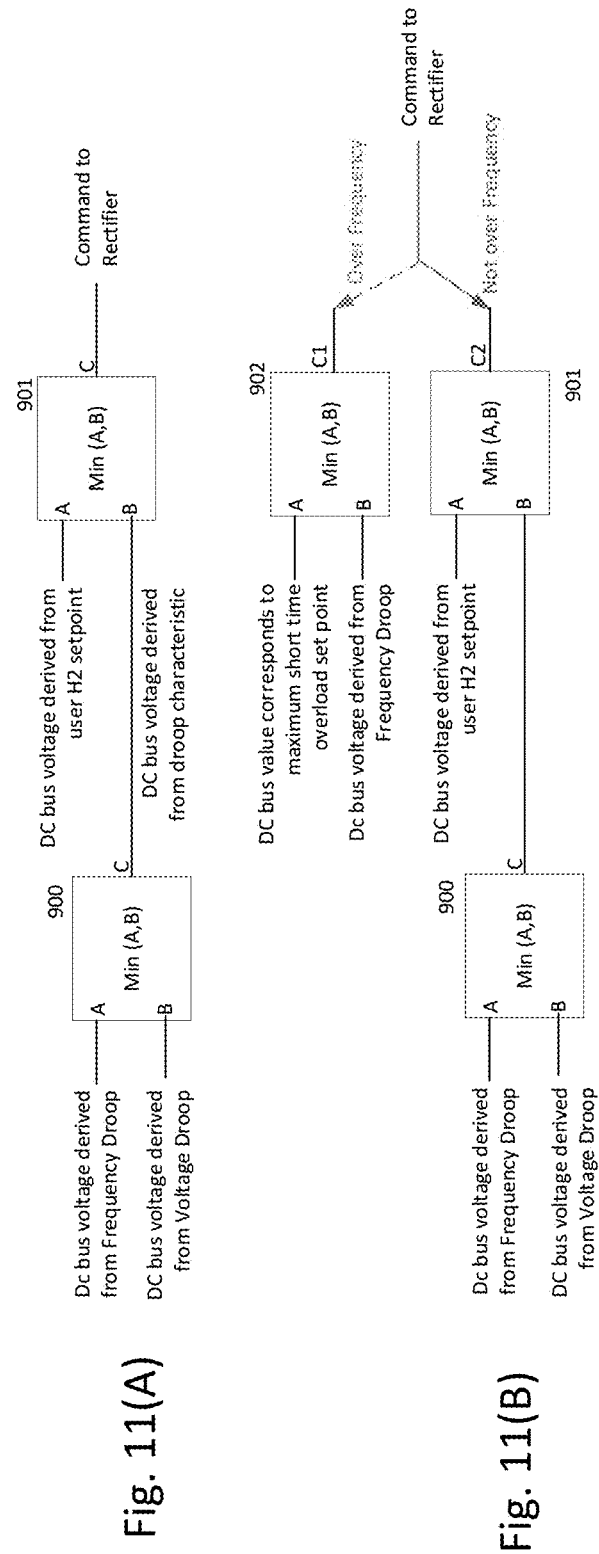

ELECTROLYZER POWER MANAGEMENT AND POWER SYSTEM CONTROL

PRIORITY INFORMATION

This application claims the benefit of U.S. Provisional Patent Application No. 63/316,950 filed on Mar. 4, 2022, which is hereby incorporated by reference in its entirety.

FIELD OF THE INVENTION

The embodiments of the present invention generally relate to electrolyzer systems, and more particularly, to electrolyzer power management and power system control.

BACKGROUND OF THE INVENTION

Electrolyzers are devices that consume electricity in order to produce hydrogen by splitting water molecules or other hydrocarbon fuel molecules. The input power source to the electrolyzer can be either a main grid (i.e., a utility grid), a microgrid, or a combination thereof. In general, the microgrid can be configured to include one or more distributed electrical resources (DERs), such as solar, wind, geothermal, hydro, storage, conventional, and the like. The main grid also can include several distributed power resources.

The electrical power system (EPS), whether it is a main grid or a microgrid, goes through various fluctuations caused by disruption in the balance between total generation power and total load power on the EPS network. Such fluctuations are increasingly present because of the intermittent nature of the power generated by renewable energy sources connected in the DERs. When the amount of power generation on the network is greater than the total load power, then the voltage and/or frequency of the power system increases. Similarly, when the total amount of load power is greater than the power generation, then voltage and/or frequency of the power system is reduced.

SUMMARY OF THE INVENTION

Accordingly, the present invention is directed to electrolyzer power management and power system control that substantially obviates one or more problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an electrolyzer system includes the electrolyzer power management and power system control configured to encode power curtailment information as a DC bus voltage level using a DC droop characteristic in first stage and decode the DC bus voltage to power information in a second stage.

It is to be understood that both the foregoing general description and the following detailed description are examples and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

FIG. 1 illustrates a system having a single stage power conversion of an electrolyzer according to an example embodiment of the present invention.

FIGS. 2a, 2b, and 2c illustrate rectifier and controller arrangements according to example embodiments of the invention.

FIGS. 4a, 4b illustrate a selection criterion of stack current in a single stage conversion electrolyzer according to an example embodiment of the present invention.

FIGS. 5a, 5b illustrate an electrolyzer system with two stages of power conversion according to example embodiments of the present invention.

FIG. 6 illustrate an electrolyzer system 600 with two stages of power conversion according to an example embodiment of the present invention.

FIGS. 7a, 7b, 7c illustrate a frequency droop control implementation in an electrolyzer with two stage power conversion using DC droop according to example embodiments of the present invention.

FIGS. 8a, 8b, and 8c illustrate frequency droop control of electrolyzers with temporary overload capability according to example embodiments of the invention.

FIGS. 9a, 9b, 9c illustrate an implementation of voltage droop control in two stage power conversion of an electrolyzer according to example embodiments of the present invention.

FIGS. 10a, 10b, 10c illustrate voltage droop control in electrolyzers with temporary overload capability according to example embodiments of the present invention.

FIGS. 11a, 11b illustrate a selection criterion of stack current in a two stage conversion electrolyzer according to an example embodiment of the present invention.

DETAILED DESCRIPTION OF THE INVENTION

Figure 3:
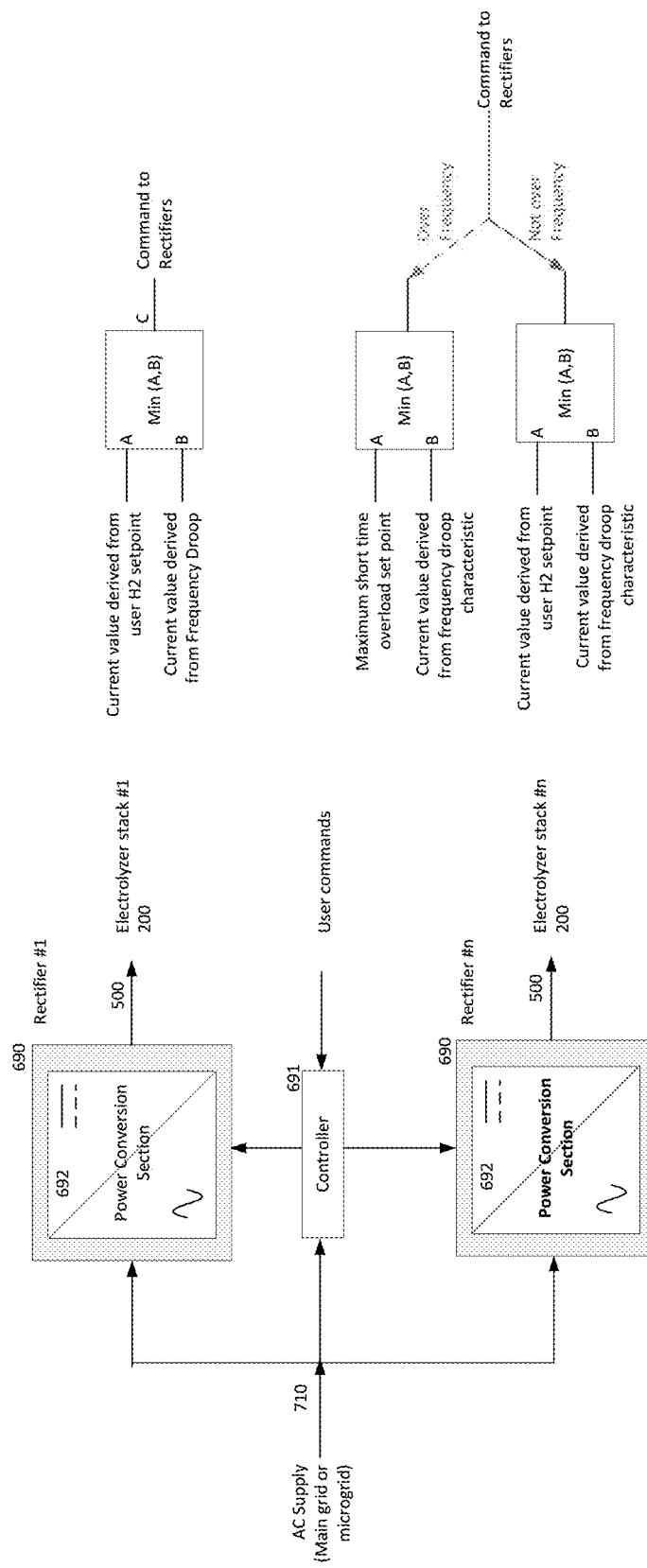
FIG. 3 illustrates a system for droop control implementation in an electrolyzer with single stage conversion according to an example embodiment of the present invention.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the embodiments of the invention or the claims.

Electrolyzers are devices that consume electrical energy and heat energy to produce hydrogen by splitting water molecules. The heat energy required by the electrolyzer can be produced from electrical energy internal to the electrolyzer. Alternatively, or additionally, heat energy can be supplied from an external source, typically through a byproduct of other processes, for example. In electrolyzers, where heat energy is derived from electrical energy, the total electrical energy required for electrolysis is the sum of electrical energy required for the stacks as well as the electrical energy to produce the required heat energy.

One or more power sources can be used for electrical energy. The input power source to the electrolyzer can be either a main grid (i.e., a utility grid), a microgrid, or a combination thereof. In general, the microgrid includes one or more distributed electrical resources (DERs), such as solar, wind, geothermal, hydro, storage (e.g., battery), conventional, and the like. The main grid (i.e., utility grid also can included distributed power resources (DERs) connected to it. As DER use increases, the reliability and power quality of the utility grid that is also largely dependent on DERs increases as well.

The electrical power system (EPS), whether it is a main grid or a microgrid, goes through various fluctuations caused by disruption in the balance between total generation power and total load power on the EPS network. Such fluctuations are increasingly present because of the intermittent nature of the power generated by renewable energy sources connected in the DERs. When the amount of power generation on the network is greater than the total load power, then the voltage and/or frequency of the power system increases. Similarly, when the total amount of load power is greater than the power generation, then voltage and/or frequency of the power system is reduced. In addition, the distributed power sources in the microgrid can be either AC coupled microgrid or DC coupled microgrid, or combination thereof, for example.

Whether it is main grid or microgrid, the electrical power system goes through various abnormalities caused by disturbance in balance of generation power and load power, especially due to the intermittent nature of power generation by connected DERs, such as solar and wind. The main two parameters that define grid stability, voltage and frequency of the power system network, are directly dependent on balance between the total amount of power generation to the network and the total amount of power consumption from the network. When the amount of power generation on the network is more than power consumption, then the frequency and/or voltage of the power system increases. Similarly, when then amount of power consumption is more than power generation, then frequency and/or voltage of the power system is reduced. If proper action is not taken to mitigate these voltage and frequency excursions, this imbalance of powers can lead to total collapse of grid, and this is applicable for both microgrid and other electrical grids. Ideally, one expects generation to respond immediately to meet the power demands of network but in practice that is not possible as many traditional generation systems have much slower response compared to loads so under generation is a constant real threat to the power system network stability.

The electrolyzer is classified as a load on the power system network as it consumes active power from the power system network to produce hydrogen. The basic electrolyzer stack (i.e., the group of electrolyzer cells) requires controlled DC current through its stacks and this power is generally taken from the AC power system of connected grid/microgrid. Therefore, every electrolyzer utilizes an AC to DC conversion device also known as a rectifier, which takes power from an AC power source and converts to DC power at its output. The rectifier can be three phase or one phase depending on the power level, and it can work from a variety of voltage and frequency levels.

Some electrolyzers have a single stage power conversion in which a rectifier that converts from AC to DC and also controls the current flowing through electrolyzer stacks. Other electrolyzers have a two stage conversion in which a first stage converts AC to fixed DC voltage and a second stage converts fixed DC to variable DC current required for electrolyzer stacks. Additionally, two stage conversion may have one rectifier supplying multiple DCDCs of multiple SOEC stacks.

The embodiments described herein can be readily applied to both single stage and two stage power conversion. In addition, the embodiments are readily applicable to all types and classifications of electrolyzers such as a) low and high temp electrolyzers, b) splitting water or splitting hydrocarbons, and c) polymer electrolyte membrane (PEM) or alkaline or solid oxide (SOEC) type.

Current solutions provide communication from a rectifier to all connected DCDCs. This communication can be an analog communication, digital communication, or power line communication. However, having a separate dedicated communication requires additional cost and the success of this feature solely depends upon the speed and reliability of the communication channel.

The rate of hydrogen production in electrolyzers can be controlled with a single parameter (i.e., current supply to the electrolyzer stack). Several other parameters such as stack temperature, physical properties of electrolyzer stack, etc. also can influence the hydrogen production rate; however, they are usually kept constant. The power consumed by the power supply that controls the stack current is directly proportional to stack current and thus directly proportional to the hydrogen production rate.

As will now be described, the embodiments generally relate to implementing frequency and voltage droop controls in electrolyzer systems and plants. Various droop control methods are described in U.S. patent application Ser. No. 18/162,060, entitled GRID SUPPORTING ELECTROLYZER, filed 31 Jan. 2023, which is hereby incorporated by reference.

Single Stage Conversion

FIG. 1 illustrates a system 100 having a single stage power conversion of an electrolyzer according to an example embodiment of the present invention.

As illustrated in FIG. 1, system 100 includes a rectifier 690 that is used to convert AC voltage of input power system 710 (i.e., utility grid or microgrid) to DC current 500 used by electrolyzer stack 200. AC voltage is typically three phase for these power levels, however, other numbers of phases, such as single phase, may be used.

FIGS. 2a, 2b, and 2c illustrate rectifier and controller arrangements according to example embodiments of the invention. The rectifiers are configured to utilize hydrogen setpoints to control load and hydrogen production.

In electrolyzer operation, the operator can either program a fixed value or send a target rate of hydrogen production (referred to as the hydrogen setpoint) to configure the rectifier. Rectifier controller 691 receives the hydrogen setpoint command and calculates the amount of stack current required to deliver that hydrogen and communicate that current setpoint to rectifier power section 692. Rectifier power section 692 executes the controller command and delivers needed amount of current to electrolyzer stack 200.

In the various configurations, controller 691 cam be integral to rectifier module 690, as shown in FIG. 2a or external to rectifier 690 as shown in FIG. 2b. Also, one controller can receive commands for multiple rectifiers/stacks from the operator, execute them, and distribute the respective current commands to those rectifiers, as shown in FIG. 2c.

Controller 691 is used to implement droop control. Controller 691 is physically located close to rectifier 690 (or integral to the rectifier module itself as shown in FIG. 2a) and monitors grid voltage and frequency directly at the input of rectifier 710. The controller uses measured voltage and frequency at input 710 to determine power inputs of rectifiers based on voltage (V) and frequency (F) droop characteristics. Controller 691 then converts that power information into stack current information.

Frequency Droop Control

FIG. 3 illustrates a system 300 for droop control implementation in an electrolyzer with single stage conversion according to an example embodiment of the present invention.

The implementation logic of frequency control is described. Controller 691 measures the frequency of AC at input 710 and derives the new power consumption setpoint for each rectifier based on the frequency droop characteristic. The rectifier then converts that input power information into current that is supplied to respective stacks. Similarly, controller 691 also receives the hydrogen production rate setpoint from the operator through another site level controller, cloud-based controller, or a fixed number stored inside controller 691 itself. The controller then converts that hydrogen production rate setpoint to an equivalent stack current.

Controller 691 compares stack currents derived from droop characteristics and operator commands and sends the lower of these two current values to its corresponding rectifier for execution. Controller 691 executes these power and current calculations periodically and updates the stack currents. In other words, rectifier output currents execute the operator hydrogen command in normal operating conditions, but rectifier output is limited to current derived from droop characteristic if current derived from droop control is less than the operator hydrogen command during abnormal conditions of the grid.

In some embodiments, the electrolyzer is configured to overproduce hydrogen (i.e., go beyond its nominal rating) for a short period of time. This type of electrolyzer also can be used to increase load on the power system network during over frequency (i.e., generation is greater than consumption). Example selection logic in electrolyzers with temporary overload capability is also shown in FIG. 3. When there is an over frequency scenario, controller 691 chooses the minimum of 'maximum short time overload setpoint' and 'current value derived from droop characteristic' and sends the result to the rectifier. If the grid frequency is not determined as being in an over frequency scenario, then the rectifier chooses minimum of 'current value derived from operator hydrogen setpoint' and 'current value determined from droop characteristic' and passes that value to rectifier.

Voltage Droop Control

In the various embodiments, as will be readily understood by one of ordinary skill in the art, the implementation of voltage droop control and current selection criterion are performed in the same way as above-explained for frequency droop implementation, with voltage being a forcing function rather than frequency. The embodiments are not limited to use of either frequency or voltage droop control, but rather may be applied to both.

Combining Frequency and Voltage Droop Characteristics

In some instances, a grid event with different combinations of over/nominal/under scenarios of frequencies and voltages can occur. Therefore, voltage and frequency droop control loops can output different power setpoints.

FIGS. 4a, 4b illustrate a selection criterion of stack current in a single stage conversion electrolyzer according to an example embodiment of the present invention. The selection criterion of power setpoint follows the logic in FIGS. 4a, 4b.

As illustrated in FIG. 4a, the rectifier controller (e.g., 691) derives two current levels from voltage and frequency droop characteristics, compares the two levels in block 900, and sends the lower of the two values to block 901 to compare with the current setpoint value derived from the operator hydrogen setpoint. Block 901 then communicates the lower of the two values to the rectifier to control the stack current.

The selection criterion logic for electrolyzers with temporary overload capability is illustrated in FIG. 4b. The main current selection logic is same as the above scenario with an addition of block 902 to cover the over frequency scenario. The controller (e.g., 691) compares 'maximum short time overload setpoint' with 'current derived from frequency droop' in block 902 and outputs the lower of the two at its output. The software logic switch chooses the current setpoint to rectifier based on the frequency status. If the frequency is determined as an over frequency condition, then output of block 902 is sent to the rectifier. If frequency is not determined as an over frequency (i.e., normal frequency or under frequency), then output of block 901 is sent to the rectifier. When it comes to active power control, frequency droop takes higher priority compared to voltage droop.

Two Stage Conversion

FIGS. 5a, 5b illustrate an electrolyzer system with two stages of power conversion according to example embodiments of the present invention.

As illustrated in FIG. 5a, the first stage contains a rectifier 690 that converts AC input power from utility or microgrid 710 into a constant DC voltage 550 and in second stage, this constant DC voltage 550 is converted to variable DC current 500 for the electrolyzer stack 200 using a DCDC converter 110. The rectifier 690 is generally designed to output constant DC voltage 550 which supplies power to DCDC converter 110 as needed.

In some configurations, multiple stacks and their respective DCDCs may be used in one electrolyzer. In addition, multiple electrolyzers can be connected to a common rectifier as shown in FIG. 5b. In such configurations, second stage DCDCs can be located physically far from the rectifiers or grid.

Frequency Droop Control

FIG. 6 illustrate an electrolyzer system 600 with two stages of power conversion according to an example embodiment of the present invention. This is an architecture for droop control implementation in two stage conversion.

Here, the rectifier controller 691 can be separate (as shown in FIG. 2s) or can be an integral part of the rectifier module (as shown in FIG. 2b). Also, a single rectifier controller 691 can be configured to control multiple rectifiers 690, as shown in FIG. 6c.

Rectifier controller 691 continuously monitors the grid voltage and frequency at rectifier input 710 and determines the required power curtailments during grid abnormalities. However, as mentioned in the above, the rectifiers are generally designed to produce fixed DC output voltage while supplying the power that connected DCDCs 110 utilize. In other words, it is not possible to control electrolyzer current directly from the rectifier or rectifier controller without active communication between them.

The embodiments of the invention provide more robust solutions without a need for active communication between the rectifier controller and DCDCs. It is proposed to use 'coded' DC bus voltage to convey the power curtailment information from rectifier controller 691 to DCDC controllers 111. Since rectifier 690, DCDC converters 110, and DCDC controllers 111 are electrically connected to same DC bus 550, they are able to monitor the voltage on DC bus 550 simultaneously, independently, and instantaneously. There is no need for separate high-speed communication lines between rectifier controller 691 and centralized DCDC controllers 111.

FIGS. 7a, 7b, 7c illustrate a frequency droop control implementation in an electrolyzer with two stage power conversion using DC droop according to example embodiments of the present invention.

The embodiments encode power curtailment information as DC bus voltage level using a DC droop characteristic in first stage and decode that DC bus voltage to power information in second stage. The desired frequency-power characteristic is shown in FIG. 7c. When frequency drops below $f_1$, the power draw by electrolyzer is expected to reduce as dictated by the slope of the droop curve between $f_1$ and $f_2$. The droop characteristic may contain multiple slopes or non-linear slopes. The desired frequency-power droop curve can be implemented through a series of two droop curves in different controllers (i.e., frequency—DC bus voltage droop curve in rectifier controller 691, and DC bus voltage—power curve in DCDC controller 111).

The rectifier 690 is designed to provide adjustable output DC voltage within a pre-determined range. The relation between electrolyzer power consumption and DC bus voltage is determined by a pre-set droop characteristic, as shown in FIG. 7b. Similarly, the relation between DC bus voltage and frequency is determined by a pre-set droop characteristic, as shown in FIG. 7a. Slopes and dead bands of droop curves in 7a and 7b can be designed specifically to achieve the desired droop curve in 7c.

Rectifier controller 691 continuously monitors frequency of the connected AC input 710. When frequency is within limits (f>$f_1$), controller 691 commands rectifier 690 to produce nominal DC output voltage, $Vdc_1$ at DC bus 550. When the input 710 frequency drops below $f_1$ the controller commands rectifier to reduce its output voltage level to a value that is less than nominal voltage level $Vdc_1$ based on the slope of DC droop and measured frequency, as shown in FIG. 7a. The governing equations for this frequency-droop control characteristics are provided below:

if $(f_{grid} \geq f_1) \rightarrow Vdc = Vdc_1$ if $((f_{grid} \geq f_2)$ AND $(f_{grid} < f_1)) \rightarrow Vdc =$ $$Vdc_1 - \left[(f_1 - f_{grid}) \times \frac{(Vdc_1 - Vdc_2)}{(f_1 - f_2)}\right]$$

if $(f_{grid} < f_2) \rightarrow Vdc = Vdc_2$ where $f_{grid}$ is measured frequency at input 710; Vdc is measured DC voltage on DC bus 550.

The slope of DC droop is designed based on nominal DC voltage $Vdc_1$, minimum voltage required for DCDCs and rectifiers to operate, $Vdc_2$, and frequency values $f_1$ and $f_2$. The typical value of $Vdc_2$ is 95-90% of nominal DC bus voltage, $Vdc_0$.

DCDC controller 111 continuously monitors DC bus voltage 550, Vdc and calculates the equivalent power based on the characteristic described in FIG. 7b. Controller 111 then derives the stack current level from this power information. The governing equations of 'DC bus voltage–power' droop curve are provided below:

if $(Vdc \geq Vdc_1) \rightarrow P = P_0$ if $((Vdc \geq Vdc_2)$ AND $(Vdc < Vdc_1)) \rightarrow P =$ $$P_0 - \left[(Vdc_1 - Vdc) \times \frac{(P_0 - P_1)}{(Vdc_1 - Vdc_2)}\right]$$

if $(Vdc < Vdc_2) \rightarrow P = P_1$ where Vdc is measured DC voltage on DC bus 550; P is target power of electrolyzer.

DCDC controller 111 derives the stack current from power P and then compares with current derived from operator hydrogen setpoint and sends the minimum of these two currents to DCDCs 110 (as described in FIG. 3a). DCDCs 110 execute that command by supplying commanded amounts of current to the stacks.

FIGS. 8a, 8b, and 8c illustrate frequency droop control of electrolyzers with temporary overload capability according to example embodiments of the invention. If electrolyzers can do temporary overload, then the droop characteristic described in FIG. 8 can be used to mitigate an over frequency scenario. The governing equations are given below:

Set 1: Frequency—DC bus droop characteristic implemented in rectifier controller 691 if $(f_{grid} < f_2) \rightarrow Vdc = Vdc_2$ if $((f_{grid} \geq f_2)$ AND $(f_{grid} < f_1)) \rightarrow Vdc =$ $$Vdc_1 - \left[(f_1 - f_{grid}) \times \frac{(Vdc_1 - Vdc_2)}{(f_1 - f_2)}\right]$$

if $(f_{grid} < f_2) \rightarrow Vdc = Vdc_2$ if $((f_{grid} \geq f_2)$ AND $(f_{grid} < f_1)) \rightarrow Vdc =$ $$Vdc_1 - \left[(f_1 - f_{grid}) \times \frac{(Vdc_1 - Vdc_2)}{(f_1 - f_2)}\right]$$

if $((f_{grid} \geq f_1)$ AND $(f_{grid} < f_3)) \rightarrow Vdc =$ $$Vdc_3 - \left[(f_3 - f_{grid}) \times \frac{(Vdc_3 - Vdc_1)}{(f_3 - f_1)}\right]$$

if $((f_{grid} \geq f_3)$ AND $(f_{grid} < f_4)) \rightarrow Vdc =$ $$Vdc_4 - \left[(f_4 - f_{grid}) \times \frac{(Vdc_4 - Vdc_3)}{(f_4 - f_3)}\right]$$

if $(f_{grid} \geq f_4) \rightarrow Vdc = Vdc_4$ where $f_{grid}$ is measured frequency at input 710; Vdc is measured DC voltage on DC bus 550.

Set 2: DC bus power droop characteristic implemented in DCDC controller 111 if $(Vdc < Vdc_2) \rightarrow P = P_1$ if $((Vdc \geq Vdc_2)$ AND $(Vdc < Vdc_1)) \rightarrow P =$ $$P_0 - \left[(Vdc_1 - Vdc) \times \frac{(P_0 - P_1)}{(Vdc_1 - Vdc_2)}\right]$$

if $(Vdc < Vdc_2) \rightarrow P = P_1$ if $((Vdc \geq Vdc_2)$ AND $(Vdc < Vdc_1)) \rightarrow P =$ $$P_0 - \left[(Vdc_1 - Vdc) \times \frac{(P_0 - P_1)}{(Vdc_1 - Vdc_2)}\right]$$

if $((Vdc \geq Vdc_1)$ AND $(Vdc < Vdc_3)) \rightarrow P = P_0$ if $((Vdc \geq Vdc_3)$ AND $(Vdc < Vdc_4)) \rightarrow P =$ -continued $$P_4 - \left[(Vdc_4 - Vdc) \times \frac{(P_0 - P_1)}{(Vdc_4 - Vdc_3)}\right]$$

if $(Vdc \geq Vdc_4) \rightarrow P = P_4$ where Vdc is measured DC voltage on DC bus 550;

P is target power of electrolyzer.

if $(Vdc \geq Vdc_4) \rightarrow P = P_4$

Voltage Droop Control

FIGS. 9a, 9b, 9c illustrate an implementation of voltage droop control in two stage power conversion of an electrolyzer according to example embodiments of the present invention.

Voltage droop control is implemented in the same way as frequency droop control except that voltage is used as a forcing function instead of frequency. The implementation of voltage droop control in two stage power conversion is illustrated in FIG. 9. The AC grid voltage—DC bus voltage droop control is implemented in rectifier controller 691. The dc bus voltage—electrolyzer power droop is implemented in DCDC controller 111. This configuration is readily applicable for both frequency droop and voltage droop implementations.

The governing equations for AC input voltage—DC bus voltage is given below:

if $(V_{grid} < V_2) \rightarrow Vdc = Vdc_2$ if $(V_{grid} \geq V_1) \rightarrow Vdc = Vdc_1$ if $((V_{grid} \geq V_2) \text{ AND } (V_{grid} < V_1)) \rightarrow Vdc =$ $$Vdc_1 - \left[(V_1 - V_{grid}) \times \frac{(Vdc_1 - Vdc_2)}{(V_1 - V_2)}\right]$$

if $(V_{grid} < V_2) \rightarrow Vdc = Vdc_2$ if $(V_{grid} \geq V_1) \rightarrow Vdc = Vdc_1$ if $((V_{grid} \geq V_2) \text{ AND } (V_{grid} < V_1)) \rightarrow Vdc =$ $$Vdc_1 - \left[(V_1 - V_{grid}) \times \frac{(Vdc_1 - Vdc_2)}{(V_1 - V_2)}\right]$$

if $(V_{grid} < V_2) \rightarrow Vdc = Vdc_2$ if $(V_{grid} \geq V_1) \rightarrow Vdc = Vdc_1$ if $((V_{grid} \geq V_2) \text{ AND } (V_{grid} < V_1)) \rightarrow Vdc =$ $$Vdc_1 - \left[(V_1 - V_{grid}) \times \frac{(Vdc_1 - Vdc_2)}{(V_1 - V_2)}\right]$$

where $V_{grid}$ is measured voltage at input 710; Vdc is measured DC voltage on DC bus 550.

FIGS. 10a, 10b, 10c illustrate voltage droop control in electrolyzers with temporary overload capability according to example embodiments of the present invention. Similarly, the voltage droop implementation and governing equations for electrolyzers with the temporary overload feature is given in FIG. 10 and below:

if $(V_{grid} < V_2) \rightarrow Vdc = Vdc_2$ if $((V_{grid} \geq V_2) \text{ AND } (V_{grid} < V_1)) \rightarrow Vdc =$ $$Vdc_1 - \left[(V_1 - V_{grid}) \times \frac{(Vdc_1 - Vdc_2)}{(V_1 - V_2)}\right]$$

-continued if $((V_{grid} \geq V_1) \text{ AND } (V_{grid} < V_3)) \rightarrow Vdc =$ $$Vdc_3 - \left[(V_3 - V_{grid}) \times \frac{(Vdc_3 - Vdc_1)}{(V_3 - V_1)}\right]$$

if $((V_{grid} \geq V_3) \text{ AND } (V_{grid} < V_4)) \rightarrow Vdc =$ $$Vdc_4 - \left[(V_4 - V_{grid}) \times \frac{(Vdc_4 - Vdc_3)}{(V_4 - V_3)}\right]$$

if $(V_{grid} \geq V_4) \rightarrow Vdc = Vdc_4$ where $f_{grid}$ is measured frequency at input 710; Vdc is measured DC voltage on DC bus 550.

Combining Frequency and Voltage Droop Characteristics

FIGS. 11a, 11b illustrate a selection criterion of stack current in a two stage conversion electrolyzer according to an example embodiment of the present invention.

In some instances, a grid event with different combinations of over/nominal/under scenarios of frequencies and voltages can occur. Therefore, voltage and frequency droop control loops can be configured to output different power setpoints.

The selection criterion of power setpoint executes the logic of FIG. 11. The logic in two stage power conversion follows the same logic described in single stage power conversion (as in FIG. 4), but the difference is the output command from rectifier controller 691 to rectifier 690 is a DC bus command rather than a stack current command.

As illustrated in FIG. 11a, the rectifier controller (e.g., 691) derives two voltage levels from voltage and frequency droop characteristics, compares the two levels in block 900, and sends the lower of the two values to block 901 to compare with the voltage setpoint value derived from the operator hydrogen setpoint. Block 901 then communicates the lower of the two values to the rectifier.

In FIG. 11b, the controller (e.g., 691) further compares 'maximum short time overload setpoint' with 'voltage derived from frequency droop' in block 902 and outputs the lower of the two at its output. The software logic switch chooses the voltage setpoint to rectifier based on the frequency status. If the frequency is determined as an over frequency condition, then output of block 902 is sent to the rectifier. If frequency is not determined as an over frequency (i.e., normal frequency or under frequency), then output of block 901 is sent to the rectifier.

The embodiments can be used in any electrolyzer technology. In the various embodiments, when there is not enough power available, priority is given to heaters over stack power and water heaters. The embodiments facilitate priority by programming droop characteristics in the connected loads. When voltage available is dropping due to load-generation unbalance, the DCDC in connected electrolyzers can determine that voltage and reduce its power to the stack. If voltage available is still dropping, then stack power can be completely reduced to zero.

It will be apparent to those skilled in the art that various modifications and variations can be made in the electrolyzer power management and power system control of the present invention without departing from the spirit or scope of the invention. Thus, it is intended that the present invention cover the modifications and variations of this invention provided they come within the scope of the appended claims and their equivalents.

What is claimed is:

1. An electrolyzer system, comprising:
   a first stage comprising an AC to DC conversion device and an AC to DC conversion device controller, said AC to DC conversion device controller configured to encode power curtailment information as a DC bus voltage level using a DC droop characteristic; and
   a second stage comprising a DC/DC converter and a DC/DC controller, said DC/DC controller configured to decode the DC bus voltage level to power information.

2. The electrolyzer system of claim 1, wherein:
   the AC to DC conversion device comprises a rectifier; and
   the AC to DC conversion device controller comprises a rectifier controller configured to supply the power curtailment information to the DC/DC controller.

3. The electrolyzer system of claim 2, wherein the rectifier controller is integral to the rectifier or separate from the rectifier.

4. The electrolyzer system of claim 1, wherein the power information determines hydrogen production of the electrolyzer system.

5. The electrolyzer system of claim 2, wherein the rectifier controller is configured to control a plurality of rectifiers.

6. The electrolyzer system of claim 2, wherein the rectifier controller monitors a grid voltage and frequency.

7. The electrolyzer system of claim 6, wherein the grid is a utility grid, a microgrid, or a combination thereof.

8. The electrolyzer system of claim 7, wherein the microgrid includes one or more distributed electrical resources selected from solar, wind, geothermal, hydro, and battery storage.

9. The electrolyzer system of claim 6, wherein different load elements have different priority in response to a reduction in grid power.

10. The electrolyzer system of claim 6, wherein load elements are programmed with droop characteristics.

11. The electrolyzer system of claim 2, wherein the rectifier is configured to provide adjustable output DC voltage within a pre-determined range.

12. The electrolyzer system of claim 2, wherein the rectifier is configured to provide adjustable output DC voltage according to a droop characteristic.

13. The electrolyzer system of claim 1, wherein the first stage is configured to supply a DC bus and the second stage is configured to receive supply from the DC bus.

14. The electrolyzer system of claim 1, wherein the AC to DC conversion device, the DC/DC converter, and the DC/DC controller are electrically connected to a DC bus.

15. The electrolyzer system of claim 14, wherein the DC/DC controller is configured to monitor a grid voltage and frequency.

16. The electrolyzer system of claim 1, further comprising an electrolyzer stack comprising a group of electrolyzer cells.

17. A method of operating an electrolyzer system, comprising:
   encoding power curtailment information as a DC bus voltage level using a DC droop characteristic in a first stage;
   decoding the DC bus voltage level to power information in a second stage;
   converting the DC bus voltage to a variable DC current; and
   providing the variable DC current to an electrolyzer stack comprising a group of electrolyzer cells.

* * * * *